Feb. 26, 1957  P. T. FAXÉN  2,783,047
TARGET HIT INDICATOR
Filed Feb. 23, 1954  6 Sheets-Sheet 1

INVENTOR:
Per Torsten Faxén
BY
ATTORNEY

Feb. 26, 1957   P. T. FAXÉN   2,783,047
TARGET HIT INDICATOR
Filed Feb. 23, 1954   6 Sheets-Sheet 2

INVENTOR:
Per Torsten Faxén
BY
ATTORNEY

Feb. 26, 1957 P. T. FAXÉN 2,783,047
TARGET HIT INDICATOR
Filed Feb. 23, 1954 6 Sheets-Sheet 3

- BLACK ZONE
- GREY ZONE
- WHITE ZONE

INVENTOR:
Per Torsten Faxén
BY
ATTORNEY

Feb. 26, 1957  P. T. FAXÉN  2,783,047
TARGET HIT INDICATOR
Filed Feb. 23, 1954  6 Sheets-Sheet 4

INVENTOR:
Per Torsten Faxén
BY
ATTORNEY

Feb. 26, 1957 P. T. FAXÉN 2,783,047
TARGET HIT INDICATOR
Filed Feb. 23, 1954 6 Sheets-Sheet 5

INVENTOR:
Per Torsten Faxén
BY
ATTORNEY

Feb. 26, 1957  P. T. FAXÉN  2,783,047
TARGET HIT INDICATOR
Filed Feb. 23, 1954  6 Sheets-Sheet 6

INVENTOR:
Per Torsten Faxén
BY
ATTORNEY

United States Patent Office 2,783,047
Patented Feb. 26, 1957

2,783,047
TARGET HIT INDICATOR

Per Torsten Faxén, Jonkoping, Sweden, assignor to Svenska Aeroplan Aktiebolaget, Linkoping, Sweden, a corporation of Sweden Application February 23, 1954, Serial No. 411,830

3 Claims. (Cl. 273—102.2)

The present invention relates to an arrangement for indicating shooting results during gunnery practice, preferably from airplanes or other aircraft to ground.

For the purpose of keeping the gunner informed of shooting results during gunnery practice from airplanes, it is previously known to obtain such results using a hit recording device. A device of this kind embraces my prior invention, British Patent No. 652,032 granted to Svenska Aeroplan Aktiebolaget, Linkoping, Sweden. In the following it is referred to a device of this type having a shock wave sensitive means (usually a microphone)— hereinafter called "transmitter"—suspended on or near the target, and a recording means—hereinafter called "recorder"—connected to the transmitter and operable to record when the strength of the shock wave emanating from a projectile passing the transmitter exceeds a predetermined value. Since the strength of the shock wave decreases with increasing distance to the passing projectile the recorder will only react to projectiles passing within a certain zone around the transmitter, viz. within the so-called sensitive zone. The sensitive zone has mainly a circular shape and can be adjusted to cover, more or less accurately, a desired target front area so that the number of actual hits within this area can be read on the recorder and forwarded to the gunner. Usually the recorder is spaced from the transmitter and a connection between them provided by electrical means. Figures 1 and 2 on the accompanying drawings show examples of known target arrangements seen obliquely from the front.

In Figure 1 the target front area is circular. The target consists of an iron ring 1 facing the gunner and supported by a vertical pole 2 rammed into the ground. A transmitter 3 is suspended in the centre of the ring 1 by means of two wires 4. A small armor plate, not shown, may be arranged in front of the transmitter to protect it from direct hits. At a certain distance from the transmitter there is placed a recorder 5, electrically connected to the transmitter by means of a cable 6. The shooting direction is shown by an arrow 7. If a projectile passes inside the ring 1 the electrical impulses generated by the transmitter will be recorded by the recorder.

In the target arrangement shown in Figure 2 the target front area is square and formed by a cloth or tarpaulin 8 placed on the ground. The other parts of the arrangement are similar to that of Fig. 1 and are therefore denoted by the same reference numbers. The pole 2 supporting the transmitter 3 is here placed in front of the target. As in Fig. 1 the transmitter 3 is connected to the recorder 5 by means of cable 6 and the shooting direction is indicated by arrow 7.

When using the hit recording device in the known way as described and exemplified above, it has proved in practice that the congruence between the number of recordings on the apparatus on one hand and the number of actual hits on or through the target on the other hand will not be complete. Especially for a small number of shots comparisons between recordings and actual hits show a relatively inaccurate congruence. This comes from the fact that the sensitive zone cannot be adjusted to cover the target front area exactly although set as good as possible.

The first reason for this difficulty is that the sensitive zone in reality has a somewhat diffuse periphery. In other words it will not remain completely constant but will vary to some extent from one shooting to another due to instrumental tolerances, ammunition irregularities, change in weather conditions, etc. A further reason can be that the target front area, for practical reasons, has been given a non-circular shape as exemplified in Figure 2, or vice versa that the shape of the sensitive zone is not accurately circular e. g. due to the existence of relatively large surfaces in the vicinity of the transmitter which reflect the shock wave.

The term of "sensitive zone" will be more fully explained with reference to Figs. 3 and 4 of the accompanying drawings.

These figures illustrate the sensitivity of the hit recording device if the transmitter is freely suspended and the shooting direction is parallel to the axis of symmetry of the transmitter. The transmitter may be considered as freely suspended when spaced to the ground or other large reflecting surfaces at least a distance equal to twice the adjusted radius of the sensitive zone. In accordance with Fig. 3 the sensitivity of the hit recording device can be divided into three zones, the borders of which are circles with their centres in the transmitter and the periphery in a plane perpendicular to the shooting direction. The innermost zone, in the figure denoted as "black zone," defines an area within which all projectiles passing therethrough are recorded. The zone surrounding the black zone, in the figure denoted "gray zone," defines a ring-shaped area within which projectiles passing therethrough are in part recorded and in part not recorded. The area outside the gray zone is in the figure denoted "white zone," and all projectiles passing this zone are not recorded. These three zones show the sensitivity of the hit recording device in relation to its "normal sensitive zone" defined as the area inside the centre line— dashed in Fig. 3— of the gray zone. The radius of said area is correspondingly called "nominal zone radius."

In Figure 4 the recording ability of the hit recording device is represented in the form of a diagram. In the diagram the origin corresponds to the centre of the transmitter, the vertical axis to the distance from the transmitter, and the horizontal axis to recording ability, defined as number of recordings calculated in percent of number of projectiles actually passing. As will be seen the recording ability within the gray zone corresponding to the gray field in Fig. 4 decreases gradually from the inner border radius to the outer border radius which means that certain percentages of wrong indication are made on both sides of the periphery line of the nominal sensitive zone. The misindications can obviously be expressed in terms of the magnitude of the gray zone and may preferably be expressed as the "recording tolerance" defined as plus minus half the difference between the border radii of the gray zone calculated in percent of the nominal zone radius.

Assuming for instance a nominal zone radius of 8 feet and a recording tolerance of ±25%, the outer and inner border radius of the gray zone will then be 10 and 6 feet respectively.

The factors that cause the recording tolerance have already been briefly indicated. More fully explained they are as follows:

1. Tolerances in the components of the transmitter, recorder, conductor between transmitter and recorder, and auxiliary equipment. Variations in power supply.

2. Variations in the atmospheric conditions such as air pressure, temperature and humidity, influencing the apparatus as well as the strength of the shock wave.

3. Tolerance of the ammunition used. The power of the shock wave is not exactly the same for two projectiles, passing at equal distance from the transmitter, which depends on certain difference in velocity, form, surface conditions and self-rotation.

The total influence of these factors makes the registration tolerance rather great, although different depending on the quality of the equipment and ammunition used. For a particular model of hit recording device tested the registration tolerance during normal conditions showed to be approximately 30% for projectiles of a calibre of half an inch and more. For projectiles of smaller calibre the tolerance was somewhat greater.

A reduction of the registration tolerance is evidently desirable and the ideal would be if the gray zone could be reduced to zero. This cannot be attained by improving conventional hit recording device of the kind, as such, since the above described sources of error are more or less inevitable and may only be reduced to a certain extent.

The present invention solves the problem by providing a new target arrangement for the principal object of obtaining improved congruence between the number of recording of the hit recording device and the number of projectiles actually striking the target.

With this and other objects in view, which will appear as the description proceeds, this invention resides in the novel construction combination and arrangement of parts substantially as hereinafter described and more particularly defined by the appended claims, it being understood that such changes in the precise embodiment of the herein disclosed invention may be made as come within the scope of the claims.

Complete examples of physical embodiments of the invention are illustrated on the accompanying drawings, in which.

Figure 5:
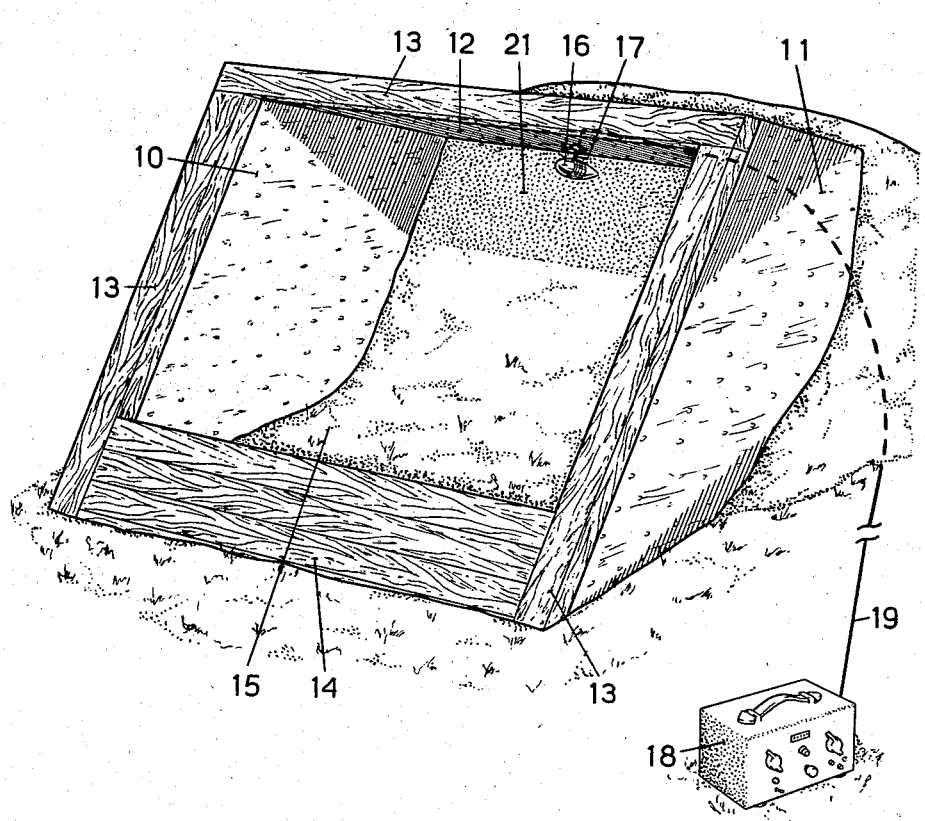
Fig. 5 is a perspective view of the hit recording device and target arrangement according to one embodiment of the invention.
Figure 6:
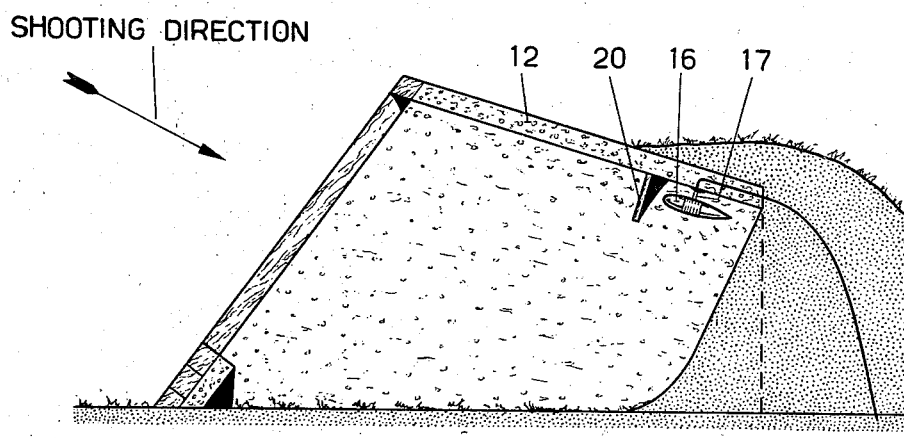
Fig. 6 is a longitudinal, vertical sectional view of the arrangement having a screen in front of the transmitter.

In the embodiment shown in Figures 5 and 6 the target is placed on a level sand surface and consists of a trapezoidal structure of reinforced concrete, comprising two vertical side walls 10 and 11 and a roof 12, joined to the upper edges of the side walls. At one end of the structure the roof and side walls are provided with protective end borders 13 of rough boards and a protective wall part 14 extends between the lower portions of the side end borders so as to define a square-formed front opening 15, forming the target area. As best shown in Fig. 6 the front edges of the side walls slope rearwardly, so that the front opening will lie in a plane which may be substantially perpendicular to the shooting direction, indicated by the arrow, or preferably have a less slope in relation to the ground than the angle between the shooting direction and the ground.

Although a reduced slope may be objectionable from a theoretical point of view it has been found favourable for the target, inter alia it saves height, and is judged to be of no practical disadvantage to the pilot. The roof is tilted a certain angle upwards from the front edge and the side walls diverge at substantially the same angle from the symmetry plane rearwards in order to diminish the risk that the projectiles passing through the opening into the cavity will strike the roof or side walls from the inside.

In connection with the target is arranged a hit recording device of previously described character, comprising a transmitter 16, which is located in the symmetry plane of the target and suspended by short wires 17 from the roof near its rear edge, and a recorder 18 spaced from the transmitter 16 and electrically connected to the latter by means of a conductor 19 for providing records of electrical impulses generated by the transmitter. It will be seen that the transmitter can be located at different places inside the target structure or behind the rear opening, although the location shown has proved to be the most suitable one for attaining satisfactory recording and for preventing the transmitter from being struck by a direct hit, if the shooting direction is normal. As shown in Fig. 6 a screen 20 of wood or other material may be fastened to the roof in front of the transmitter 16 and may preferably extend over the whole width of the structure. The screen improves the recording ability simultaneously as it protects the transmitter from sand thrown up by hits inside the target. To further improve the recording ability it has been found suitable to provide the target with a rear wall 21 which may consist of any suitable material and on the drawings consists of a sand wall.

Figure 7:
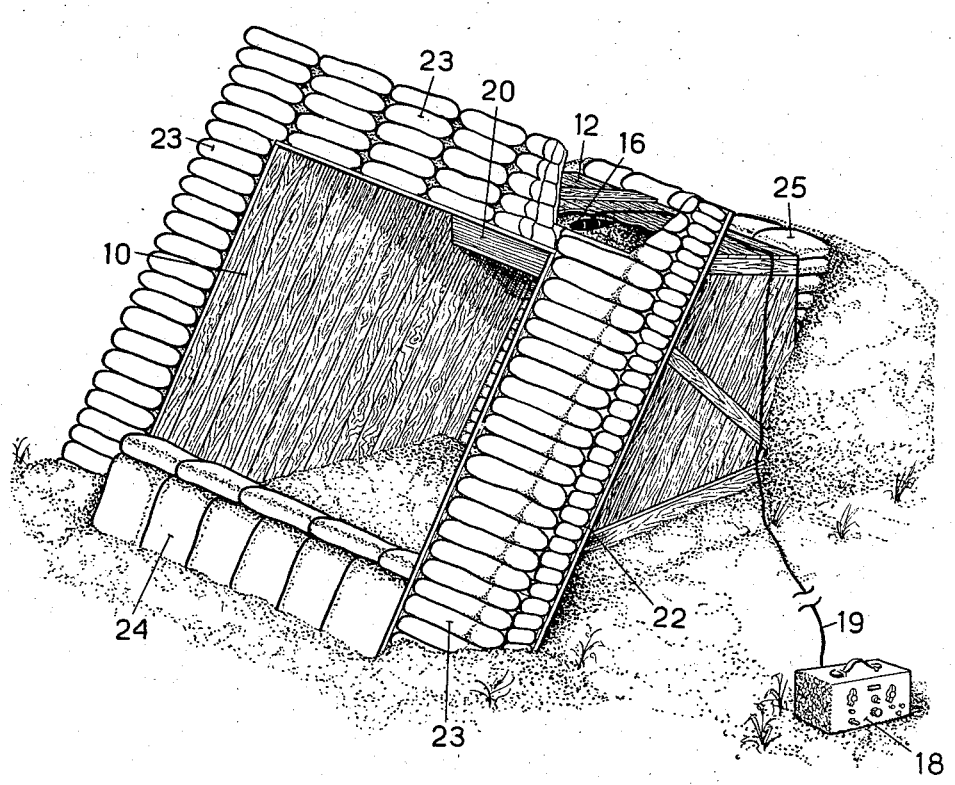
Fig. 7 is a perspective view of the hit recording device and target arrangement according to another embodiment of the invention.

A target arrangement of above described kind is comparatively heavy and therefore intended for stationary use. It may, however, be desirable to procure a target arrangement which is easy to transport to be placed anywhere for more or less temporary use. An embodiment of such a target arrangement is disclosed in Figure 7. The form of the target structure is similar to the embodiment shown in Figures 5 and 6, but the side walls 10 and 11 and the roof 12 consist here of rough boards reinforced by crossboards of the same material. Parallel to the plane through the opening 15 and in spaced relation thereto there are arranged cross-walls 22 which surround the side walls and the roof and are supported thereby through a number of brackets, not shown. The cross-walls 22 serve as a shelf for sand bags 23 stacked upon each other around the edge of the opening to catch projectiles passing outside the opening and to protect the outer sides of the side walls and the roof. The front wall part 14 in Figures 5 and 6 is here covered by sand bags 24, which together with the sand bags 23 form a bullet-proof demarcation zone all around the front opening. The rear end of the target structure is closed by a rear wall which here consists of sand bags 25 stacked upon each other so as to form the wall. The relative location and arrangement of transmitter, conductor, recorder and screen is similar to that described in connection with the embodiment in Figures 5 and 6 and need therefore not be described here.

By combining a transmitter with a target of the above described character, a close congruence will be obtained between the recordings of the hit recording device and the actual hit result, depending on the fact that the walls of the target: (1) by reflection amplify the effect of the shock wave from projectiles passing inside the walls, thereby causing the black zone to expand and fill up the target front area, (2) by shielding weaken the effect of the shock wave from projectiles passing outside the walls, thereby causing the white zone to contract closely around the target front area.

Figure 1:
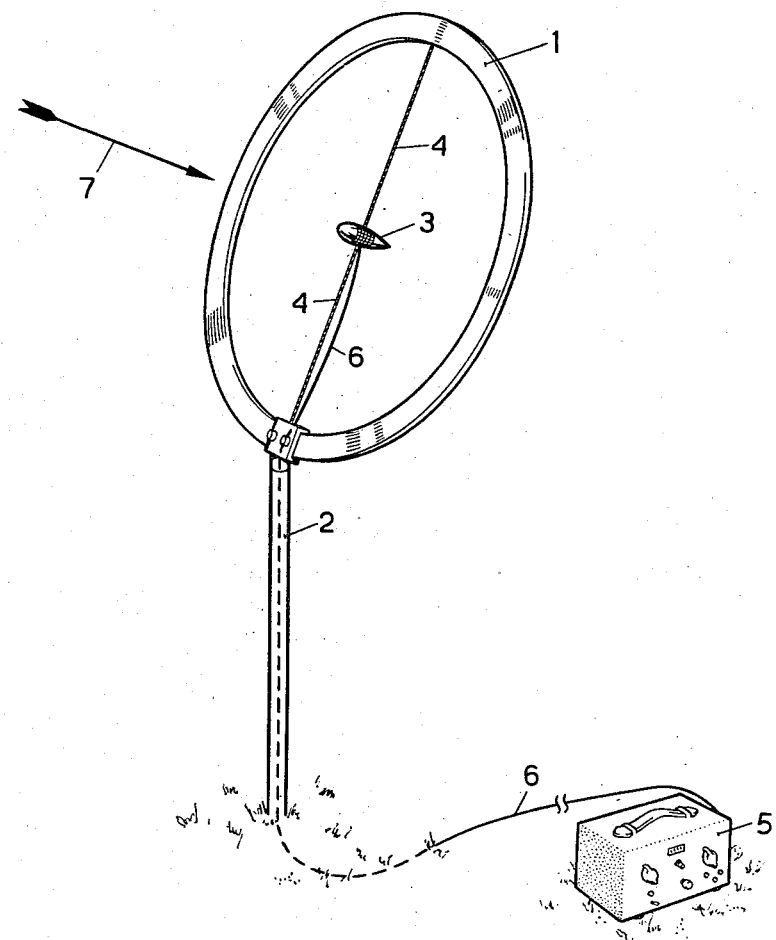
Figure 2:
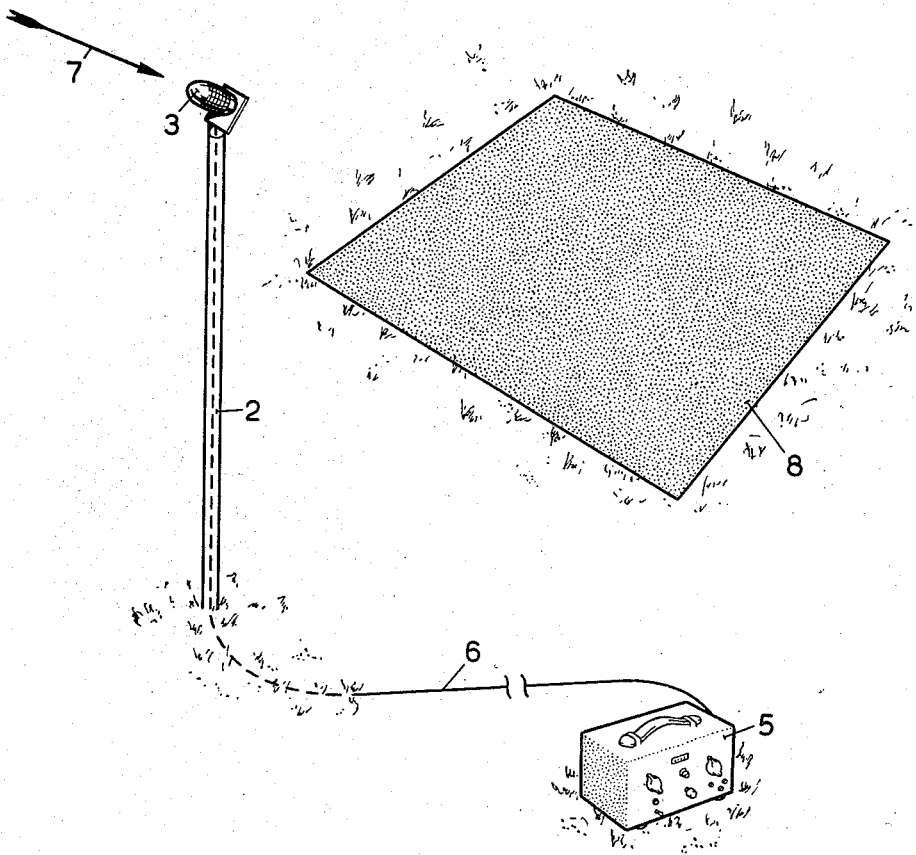
Figure 3:
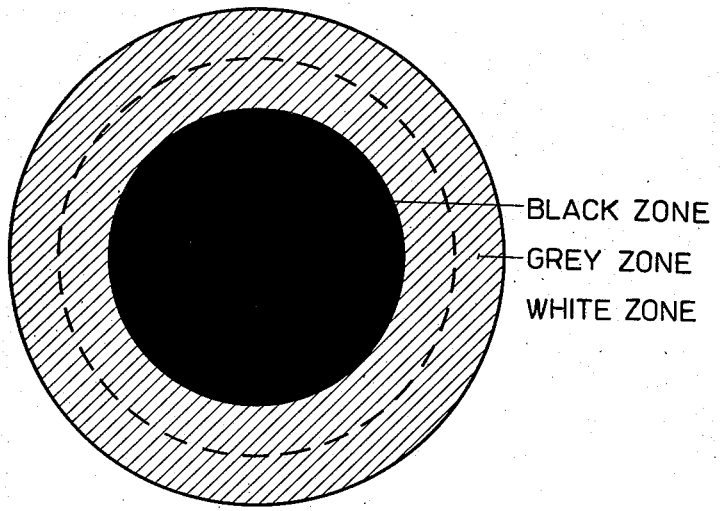
Figure 4:
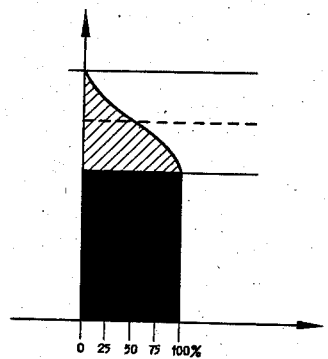
Figure 8:
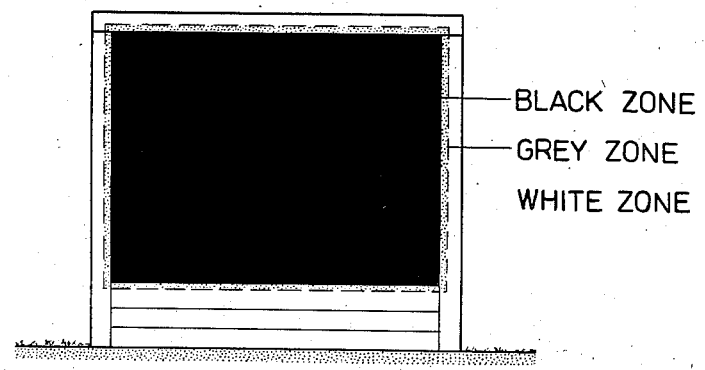
Fig. 8 is a diagrammatic view illustrating the registration ability of the hit recording device in the arrangement of Figs. 5–7.

The improved recording accuracy of the hit recording device when combined with the target described is illustrated in Figure 8, in which the different zones are denoted in accordance with Fig. 3. From Figure 8 it will be noticed that the gray zone has diminished to a small strip round the target front opening and that the black zone has a configuration and a size coinciding with the same area. The congruence between recordings on the apparatus and actual hits striking the target will thereby be almost complete.

What I claim as my invention is:

1. In target apparatus wherein the shock wave of a projectile traveling at supersonic velocity is utilized to register the accuracy of the firing, the combination of: wall means defining a front opening forming the target front area and extending rearwardly from said front opening so as to amplify shock wave pressure impulses of projectiles passing inside the target area by reflection from said wall means and to shield the zone within said wall means from the effect of shock wave pressure impulses produced by projectiles passing outside the target area; a shock wave sensitive device operable to generate a signal in response to shock wave pressure impulses manifested upon said device; means positioning said device in the zone bounded by said wall means so that said device will be responsive to shock wave impulses produced by projectiles entering the target area but not those produced by projectiles which pass outside the target area; and recording apparatus connected to said device and operable to record the signals emanating from said device.

2. In target apparatus the combination set forth in claim 1 further characterized by the provision of rear wall means joining said rearwardly extending wall means and closing the rear of the zone bounded by said rearwardly extending wall means so as to further amplify shock wave pressure impulses of projectiles entering said zone through the target area.

3. In target apparatus the combination set forth in claim 1 further characterized by the fact that said wall means diverge rearwardly from the front target area defined thereby.

References Cited in the file of this patent

UNITED STATES PATENTS

| | | |
|---|---|---|
| 2,201,527 | Freeman | May 21, 1940 |
| 2,411,026 | Conner | Nov. 12, 1946 |
| 2,448,587 | Green | Sept. 7, 1948 |
| 2,557,550 | Leaver | June 19, 1951 |

FOREIGN PATENTS

| | | |
|---|---|---|
| 652,032 | Great Britain | Apr. 18, 1951 |